United States Patent

[11] 3,611,164

[72] Inventor Christopher C. Day
    Newtonville, Mass.
[21] Appl. No. 887,519
[22] Filed Dec. 23, 1969
[45] Patented Oct. 5, 1971
[73] Assignee American Optical Corporation
    Southbridge, Mass.

[54] ABSOLUTE MAGNITUDE PEAK DETECTOR
    1 Claim, 10 Drawing Figs.
[52] U.S. Cl.................................................. 328/151,
    307/235, 328/146, 328/209
[51] Int. Cl........................................................ H03f 3/50
[50] Field of Search............................................ 307/235,
    236, 238; 328/132, 146, 147, 148, 150, 151, 209

[56] References Cited
    UNITED STATES PATENTS
    3,018,442  1/1962  Goodman.................... 328/150
    3,204,118  8/1965  Rotier......................... 328/150 X
    3,328,705  6/1967  Eubanks...................... 307/235 X
    3,363,113  1/1968  Bedingfield................. 328/151 X
    3,509,372  4/1970  Bicking....................... 328/150 X
    3,509,474  4/1970  Arnold et al................. 307/236 X
    3,526,786  9/1970  Snyder........................ 307/235

OTHER REFERENCES
    Kruppa, "Low-Frequency Peak Detector," IBM Technical Disclosure Bulletin, Vol. 10, No. 8, (pages 1085 and 1086), 1/1968

*Primary Examiner*—Donald D. Forrer
*Assistant Examiner*—L. N. Anagnos
*Attorneys*—William C. Nealon, Noble S. Williams, Robert J. Bird and Amster & Rothstein ABSTRACT: An absolute magnitude peak detector having a pair of operational amplifiers with only a single additional diode and only a single pair of matched resistors. The input signal is coupled to a different polarity input of each amplifier. The amplifier outputs are tied together and coupled through the diode to an output capacitor. The potential of the junction of the diode and the capacitor is fed back to an input of each amplifier, with the same diode thus being included in both feedback paths.

PATENTED OCT 5 1971
3,611,164
SHEET 1 OF 2
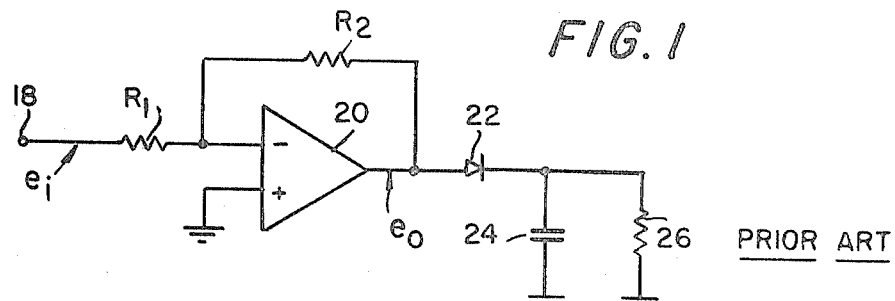
FIG. 1
PRIOR ART
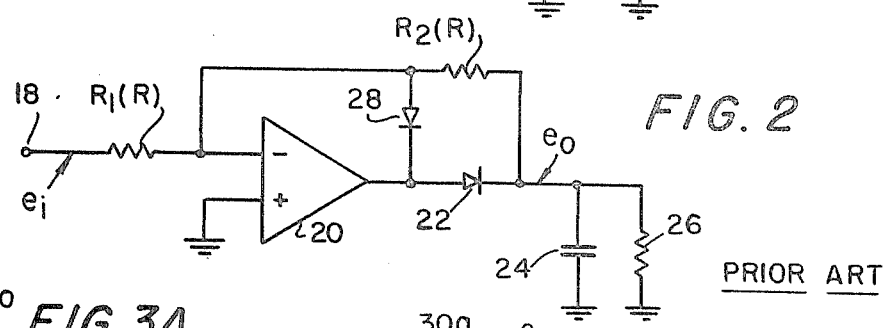
FIG. 2
PRIOR ART
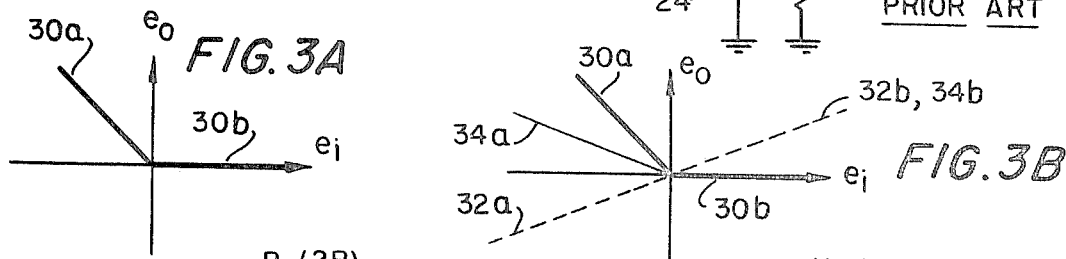
FIG. 3A
FIG. 3B
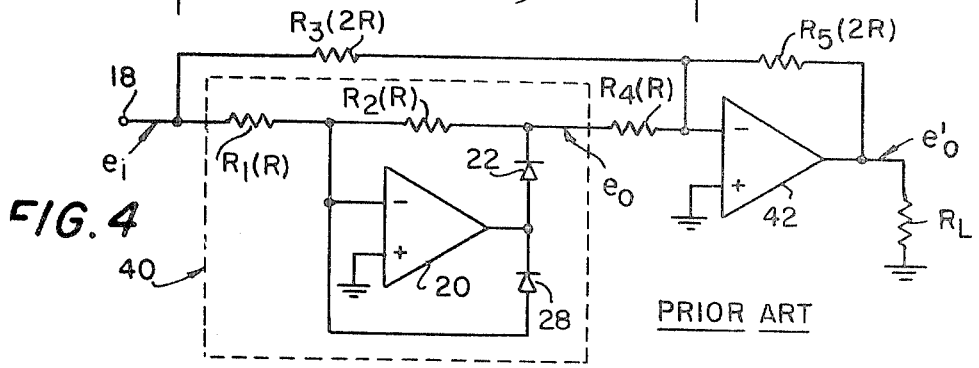
FIG. 4
PRIOR ART
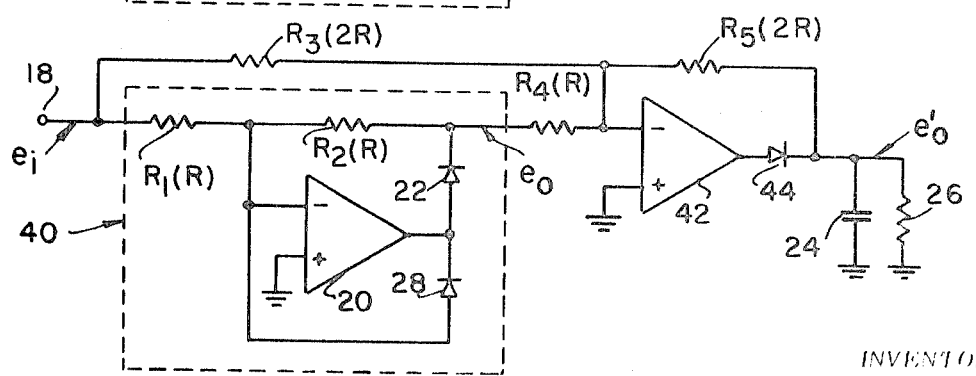
FIG. 5
INVENTOR
CHRISTOPHER C. DAY
Amster & Rothstein
ATTORNEYS

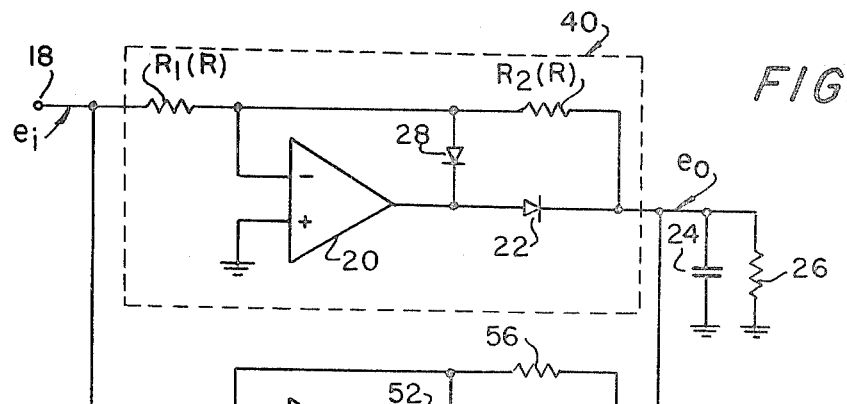
FIG. 6
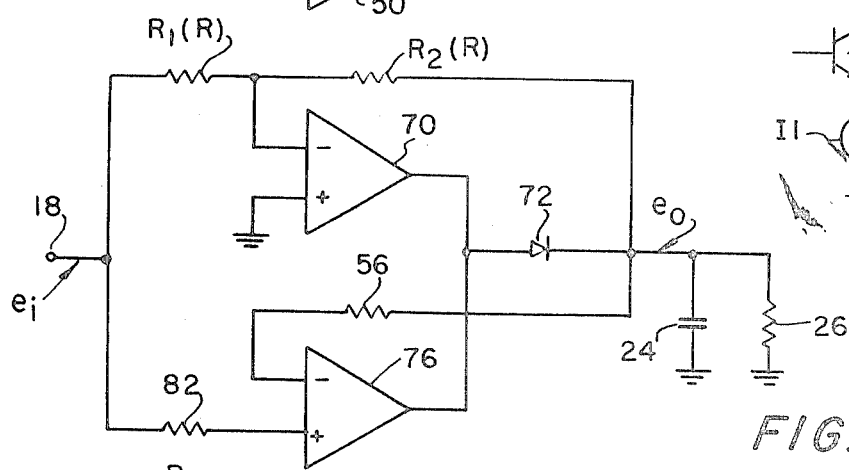
FIG. 7
FIG. 8
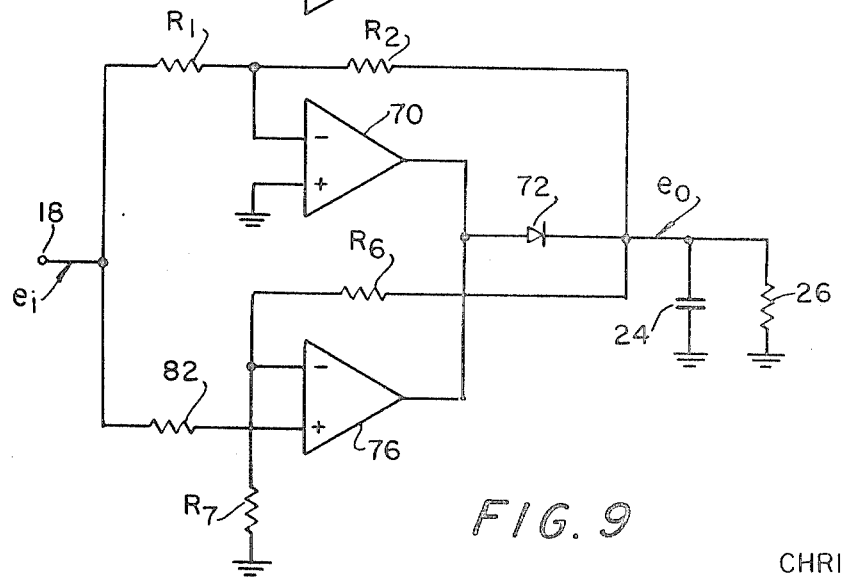
FIG. 9
INVENTOR
CHRISTOPHER C. DAY
Amstee & Rothstein
ATTORNEYS

ABSOLUTE MAGNITUDE PEAK DETECTOR

This invention relates to absolute magnitude peak detectors, and more particularly to highly accurate peak detectors incorporating a pair of operational amplifiers and requiring very few additional elements and a reduced number of matched impedances.

In many electronic systems it is necessary to detect the absolute magnitude of a peak voltage. The voltage itself may go positive or negative; the output of the peak detector is always of the same polarity (for example, positive) and its magnitude is proportional to the maximum swing of the signal in either direction. In most cases, it is necessary for the output signal to follow the input signal with a relatively long time constant.

For example, the input signal might be an electrocardiographic signal, and the output signal might be proportional to the absolute magnitude of the input signal peak no matter what its polarity. The electrocardiographic waveforms occur at a typical rate of 70 per minute. It would be of little value, for example, to charge an output capacitor to the absolute magnitude of the input signal peak and to allow the capacitor voltage to remain at the peak level for hours. What is important is the peak level for an appreciable fraction of a minute, not the peak level for the duration of the monitoring. For this reason it is standard practice to place a discharge resistor across the output capacitor. The capacitor is quickly charged to the rectified peak level of the input. However, following each charging of the capacitor, it slowly discharges through the discharge resistor. The discharge time constant might be in the order of 10 seconds in the case of an electrocardiographic input signal.

Various absolute magnitude peak detectors have been proposed in the prior art. Many of these use operational amplifiers in order to achieve high accuracy. However, the prior art circuits generally require a great number of elements in addition to a pair of operational amplifiers. Moreover, the systems generally require a relatively large number of resistors to have predetermined impedance ratios thereby adding to the cost of fabrication.

It is an object of my invention to provide an absolute magnitude peak detector incorporating two operational amplifiers, a reduced number of other circuit elements, and a reduced number of resistors with predetermined impedance ratios.

In accordance with the principles and features of my invention, the outputs of a pair of amplifiers are tied together and extended to an output capacitor across which is placed a discharge resistor. To prevent discharge of the capacitor into the low-impedance outputs of the operational amplifiers, an isolating diode is inserted between the junction of the amplifier outputs and the capacitor.

Further objects, features, and advantages of my invention will become apparent upon consideration of the following detailed description in conjunction with the drawings, in which:

FIG. 1 depicts a prior art unipolar inverting peak detector;

FIG. 2 depicts a prior art unipolar inverting peak detector having characteristics superior to those of the detector of FIG. 1, and whose understanding will be helpful in considering the principles of operation of my invention;

FIG. 3A depicts the transfer characteristic of the unipolar inverting peak detector of FIG. 2;

FIG. 3B illustrates the manner in which the transfer characteristic of FIG. 3A can be modified to produce a (bipolar) absolute magnitude peak detector;

FIG. 4 depicts a prior art precision rectifier which can be adapted for use in an absolute magnitude peak detector;

FIG. 5 depicts an absolute magnitude peak detector which can be constructed by using the rectifier of FIG. 4, and illustrates the shortcomings which are found in the prior art absolute magnitude peak detectors;

FIG. 6 depicts another absolute magnitude peak detector which also suffers from a number of disadvantages but will be helpful in understanding the illustrative embodiments of the invention;

FIG. 7 depicts the connection of the output stages of two operational amplifiers and illustrates the effect of tying together two operational amplifiers each of which has a positive drive capability exceeding its negative drive capability;

FIG. 8 depicts a first illustrative embodiment of my invention; and

FIG. 9 depicts a second illustrative embodiment of my invention.

A typical prior art operational amplifier configuration includes two resistors $R_1$ and $R_2$ as shown in FIG. 1. The input signal $e_i$ at terminal 18 is coupled to the negative input of operational amplifier 20 through resistor $R_1$. The output voltage $e_o$ is fed back to the negative input of the amplifier through resistor $R_2$. The positive input of the amplifier is grounded. An ideal operational amplifier is characterized by zero output impedance, infinite input impedance, infinite open loop gain, zero voltage drop across the two input terminals, and zero input current. (These various characteristics are mutually dependent. For example, the conditions of zero voltage drop and current imply the other conditions.) It can be shown that the closed loop gain ($e_o/e_i$) of the operational amplifier of FIG. 1 is equal to $-R_2/R_1$.

The circuit of FIG. 1 functions as a unipolar inverting peak detector. For any negative input signal, the output signal $e_o$ is positive. The output signal is extended through diode 22 and impressed across capacitor 24. With resistor 26 omitted, if the input signal decreases in absolute magnitude, diode 22 is reverse biased and capacitor 24 remains charged at its peak level. However, with the inclusion of resistor 26 the capacitor can discharge through it. In this way, the peak voltage across capacitor 24 can be "up-dated." Typically, the discharge time constant (the product of the magnitudes of resistor 26 and capacitor 24) is much greater than the time period between repetitive waveforms in the input signal. Thus the voltage across capacitor 24 is proportional by the factor $R_2/R_1$ to the peak level of the input signal over a number of cycles. The peak detector is "inverting" because for a negative input the output is positive.

The circuit of FIG. 1 has two major shortcomings. First, it can only detect the peak of a negative input; $e_o$ is negative and reverse biases diode 22 when the input is positive. Second, the voltage across capacitor 24 is less than output voltage $e_o$ by the drop across diode 22. Typically, this drop is in the order of 0.5 volts and varies with $e_o$. This large a drop makes the peak detector unacceptable for use in many cases.

The circuit of FIG. 2 is also unipolar in operation, but due to the placing of diode 22 before the connection to the feedback impedance $R_2$, the 0.5- volt-output inaccuracy is eliminated. The circuit operation can best be understood by first neglecting diode 28. When the input signal $e_i$ goes negative, the output of the operational amplifier goes positive and a positive potential is extended through diode 22 to capacitor 24. The output signal $e_o$ which is now fed back to the negative input of the operational amplifier is the potential at the junction of the diode and the capacitor. The feedback loop insures that $|e_o/e_i|$ equal $R_2/R_1$, where $e_o$ is now taken after the diode. If resistors $R_1$ and $R_2$ have the same magnitude R as shown in FIG. 2, $e_o = -e_i$. By placing diode 22 before the connection to the feedback path, the drop across the diode is automatically corrected. The diode has no effect on the closed loop equation defining the circuit operation because the operational amplifier is assumed to have infinite gain. The transfer function is dependent only on the magnitudes of resistors $R_1$ and $R_2$.

In the circuit of FIG. 1, a positive input signal is not extended through resistors $R_1$ and $R_2$, and diode 22 to capacitor 24 because resistor $R_2$ is shorted to ground through the low output impedance of the amplifier. But in the circuit of FIG. 2, resistor $R_2$ is not shorted to ground in this manner because for a positive input signal the negative output of the operational amplifier reverse biases diode 22. A positive input signal would ordinarily be transmitted directly through resistors $R_1$ and $R_2$ to capacitor 24. This transmission is prevented by diode 28. When the input signal goes positive, diode 28 shorts the junction of resistors $R_1$ and $R_2$ to ground through the low-impedance amplifier output. The diode does not affect the circuit operation for a negative input because for such a signal it is reverse biased.

In the absence of diode 28, and with diode 22 reverse biased, there is no feedback and the voltage drop across the input terminals of the operational amplifier cannot be held to zero. The input stage of the amplifier might be damaged since it cannot take an excessive drop. The circuit is protected by using a large magnitude resistor $R_1$ and diode 28. A feedback path is provided by the diode when the input signal goes positive. The negative output of the operational amplifier is shorted through the diode to the negative input of the amplifier. The large resistor also serves to prevent excessive current flow. The circuit of FIG. 2 is a standard prior art unipolar peak detector.

The transfer characteristic of the circuit of FIG. 2 is shown in FIG. 3A and consists of two straight line segments 30a, 30b. When the input signal is positive, the output voltage across capacitor 24 is zero. When the input signal is negative, the output voltage is positive. If resistors $R_1$ and $R_2$ have the same magnitude, the slope of line segment 30a is −45°; the output voltage equals the input voltage but is of opposite polarity.

FIG. 3B illustrates how the transfer characteristic of FIG. 3A can be modified to produce an absolute magnitude peak detector, that is, a peak detector whose output voltage equals the absolute magnitude of the peak of the input voltage. The transfer characteristic including line segments 30a, 30b is first drawn on FIG. 3B. Assume now that an additional transfer characteristic consisting of the line segments 32a, 32b is drawn at an angle of 22.5° with the horizontal axis, and that the sum of the two transfer characteristics defines a system transfer characteristic. It is readily apparent that upon adding the two different characteristics the composite transfer characteristic consisting of line segments 34a, 34b is derived. The sum of the transfer characteristics defined by line segments 30b and 32b is simply the latter. Thus the composite transfer characteristic segment 34b is the same as transfer characteristic segment 32b. The sum of transfer characteristic segments 30a and 32a is as shown by transfer characteristic segment 34a, at an angle of 22.5° with the horizontal axis. It is thus seen that the overall transfer characteristic consisting of line segments 34a, 34b is symmetrical about the vertical axis and a system having the characteristic can function as an absolute magnitude peak detector.

FIG. 4 depicts a prior art rectifier which can be modified to function as an absolute magnitude peak detector. The circuit serves to derive an output voltage $e_o'$ across load resistor $R_L$ which equals the absolute magnitude of the input voltage $e_i$ at terminal 18. It will be noted that that part of the circuit contained within box 40 is the same as the circuit of FIG. 2 from input terminal 18 to the junction of diode 22 and resistor $R_2$. Accordingly, $e_o/e_i=1$. Using the principle of superposition, the output of operational amplifier 42 can be determined by adding together the outputs resulting from a first input $e_o$ fed through resistor $R_4$, and a second input $e_i$ fed through resistor $R_3$. With respect to $e_o$, the gain of operational amplifier 42 is simply $-R_5/R_4$. Since resistor $R_5$ has a magnitude 2R and resistor $R_4$ has a magnitude R, the gain is −2. For a negative $e_i$ signal, $e_o=|e_i|$ and $e_o'=-2|e_i|$. For a positive $e_i$ signal, $e_o=0$ and $e_o'=-|e_o|=0$.

For the input signal $e_i$ fed through resistor $R_3$ to the negative input of operational amplifier 42, the gain is $-R_5/R_3$ or −1. Thus the component in $e_o'$ from the feeding of signal $e_i$ through resistor $R_3$ is $|e_i|$ for a negative input and $-|e_i|$ for a positive input.

For a negative input, the two components when added together result in an output signal $e_o'=-2|e_i|+|e_i|=-|e_i|$. When the input signal is positive, the two components when added together result in an output signal $e_o'=0-|e_i|$. It is apparent that the circuit functions as a rectifier—the voltage (always negative) across load resistor $R_L$ equals the absolute magnitude of the input signal.

The prior art circuit of FIG. 4 could be modified to function as an absolute magnitude peak detector simply by replacing load resistor $R_L$ by a capacitor 24 (together with a discharge resistor 26). However, in such a case capacitor 24 could discharge through the low output impedance of operational amplifier 42. In other words, instead of functioning as a peak detector with a slow discharge time constant, the circuit would simply function as a rectifier. (The capacitor cannot discharge rapidly through resistor $R_5$ which is typically of very large magnitude.) For this reason, it is necessary to incorporate diode 44 in the circuit, as shown in FIG. 5. The diode prevents the discharge of capacitor 24 into the low output impedance of operational amplifier 42. Referring back to FIG. 2 it will be recalled that the inclusion of a diode between the output of an operational amplifier and the feedback loop does not affect the loop equation since the amplifier is presumed to have infinite gain.

The circuit of FIG. 5 is a highly accurate absolute magnitude peak detector. But the circuit has a number of shortcomings. In addition to the two operational amplifiers, many other elements are required, including five resistors $R_1$–$R_5$ and three diodes. What is more important, however, is that all five resistors must be accurately matched. Three of the resistors must equal each other, and the other two resistors must have impedances twice as large as the first three.

The circuit of FIG. 6 depicts another absolute magnitude peak detector which can be designed based upon the prior art circuit of FIG. 2 (The major shortcoming of the circuit of FIG. 6, as compared with the embodiment of the invention shown in FIG. 8, is that the latter requires only one diode while the former requires four.) The circuit of FIG. 6 includes two complementary operational amplifier configurations. The upper configuration, contained in box 40, is the same as that considered in FIGS. 2 and 4. When the input signal $e_i$ is positive, operational amplifier 20 does not affect output voltage $e_o$. When the input voltage is negative, operational amplifier 20 contributes a component $+|e_i|$ to the output voltage.

Operational amplifier 50 is noninverting as a result of the connection of the input signal to the positive, rather than the negative, input terminal. When $e_i$ is positive, the output of operational amplifier 50 goes positive and diode 54 conducts. The potential extended through the diode is fed back through resistor 56 to the negative input of the amplifier. The drive of the amplifier is reduced. The output potential increases until there is a null voltage across the two inputs of the amplifier. As a result of the nulling effect, the junction of resistor 56 and diode 54 is at the potential $e_i$. The magnitude of resistor 56 does not enter into the loop equation. As for diode 54, because it is contained within the feedback loop, it also does not affect the loop equation. For such a position input signal, operational amplifier 20 does not affect the output voltage $e_o$. The output voltage equals the input voltage $e_i$ only as a result of the signal transmitted through operational amplifier 50. Diode 52 does not affect the circuit operation—operational amplifier 50 theoretically has a virtual ground at its negative input terminal anyway.

When the input signal is negative, the output of operational amplifier 50 is also negative. Diode 54 is reverse biased and operational amplifier 50 does not affect the output voltage of the system. Instead, the potential $e_o$ is determined only by operational amplifier 20, and as described above $e_o=|e_i|$. It is seen that each operational amplifier functions to control the output voltage $e_o$ only when the input signal is of a respective polarity. Only one of the operational amplifiers affects the output at any time.

Diode 52 is included in the circuit because in case of a negative input, diode 54 is reverse biased and there is no feedback to the negative input terminal of operational amplifier 50. As described above in connection with FIG. 2, it is desirable to provide feedback for an operational amplifier at all times. By providing the feedback even when the input signal is negative, the potential between the two input terminals of the operational amplifier is nulled; otherwise, the voltage across the two input terminals could become quite large and the diodes typically included at the input of an operational amplifier could be destroyed.

The circuit of FIG. 6 operates as an absolute magnitude peak detector. Capacitor 24 is charged by current flowing from either of the two operational amplifiers depending on the polarity of the input signal. The capacitor cannot discharge into the low-impedance output of either amplifier due to the inclusion of diodes 22 and 54 in the system. The capacitor does discharge through resistor 26 so that the output signal can "track" the peak of the input signal over a period of interest. (Alternatively, if resistor $R_2$ is low enough in magnitude the capacitor can discharge through this resistor, diode 28 and the output impedance of amplifier 20, and resistor 26 can be omitted.) The circuit of FIG. 6 requires only two matched resistors. However, it does require the use of four diodes.

Before proceeding to a description of FIGS. 8 and 9, it will be helpful to consider FIG. 7 which depicts the outputs of two operational amplifiers tied together across a common resistor 62. Transistor T1 is the output transistor of the first operational amplifier and transistor T2 is the output transistor of the second. The emitter circuit of each transistor includes a constant current source I1 or I2.

The current through source I1 is constant at all times. The current flows into the source from either the emitter of transistor T1, the emitter of transistor T2, or from ground through resistor 62. Similar remarks apply to the current through source I2.

Considering just transistor T1, source I1 and resistor 62, when the base potential is negative less current flows through the transistor and the current through resistor 62 is determined primarily by the constant current of source I1. Actually, this current causes the junction of resistor 62 and the emitter of the transistor to be negative, and thus transistor T1, even though its base potential may be negative, can conduct provided the emitter potential is more negative than the base potential. However, as soon as the emitter potential goes positive enough relative to the base potential, the transistor cuts off. The transistor thus has a limited negative drive capability, determined by the magnitude of source I1. It has a large positive drive capability, however, because the larger the base drive, the greater the emitter current and the voltage drop across resistor 62.

In FIG. 6, the two transistors have their outputs tied together. The operation of each transistor is now affected by the other. Suppose the base potential of transistor T1 is greater than that of transistor T2. Since the base-emitter drops would be approximately equal were both transistors to conduct, it is clear that transistor T2 cannot conduct—the common emitter potential is determined by the higher of the two base voltages and the transistor with the lower base potential is cut off.

The function of diode 28 in FIG. 6 is to clamp the negative input terminal of operational amplifier 20 to the amplifier output. A signal cannot be transmitted through resistors $R_1$ and $R_2$ to affect the output voltage. In the circuit of FIG. 8, when the input signal $e_i$ is positive, the output of amplifier 76 is positive. Diode 72 is forward biased and thus any signal transmitted through resistor $R_2$ is shorted through diode 72 and the low-impedance output of amplifier 76 to ground. Thus diode 28 can be omitted from the circuit of FIG. 8.

Diode 52 is included in the circuit of FIG. 6 to prevent an excessive input drive of amplifier 50 when $e_i$ is negative. In FIG. 8, the diode is omitted and instead large-magnitude resistor 82 is substituted for it. The resistor limits the amplifier input drive. When $e_i$ is positive, the resistor has no effect on the circuit operation previously described since the input impedance is assumed to be infinite.

Diodes 22 and 54 in the circuit of FIG. 6 serve to prevent both amplifiers from affecting the output voltage at the same time—one of the diodes is cut off at all times. In the circuit of FIG. 8, each amplifier has a positive drive capability exceeding its negative drive capability. Thus the amplifier with the greater output cuts off the other—by tying the outputs together, the two diodes can be omitted.

However, it is necessary to include diode 72 in the circuit of FIG. 8. The peak input signal causes capacitor 24 to charge to a peak value. As the absolute magnitude of the input signal decreases, capacitor 24 cannot discharge through resistor $R_2$ or resistor 56 since these resistors can be made large in magnitude. However, in the absence of diode 72, the capacitor could discharge through the outputs of the amplifiers. The output impedances of conventional operational amplifiers are very low and capacitor 24 would discharge so rapidly that the potential across it would essentially follow the input potential. If both operational amplifiers had no negative drive capabilities, capacitor 24 could not discharge through their output circuits since current could not flow from the capacitor into the amplifier outputs. However, a conventional operational amplifier does have some negative drive capability even though it is less than the positive drive capability. Typically, the negative drive capability is in the order of a few milliamperes, with the positive drive capability being two or three times as great. The function of diode 72 is to prevent capacitor 24 from discharging into the amplifier outputs. The capacitor can only discharge through resistor 26, which resistor thus determines the discharge time constant.

Diode 72 is incorporated in the feedback loop of each amplifier since the output of amplifier 76 is fed through the diode and resistor 56 to its negative input terminal, and the output of amplifier 70 is fed through the diode and resistor $R_2$ to its negative input terminal. However, because the diode is included in each feedback loop, rather than being external to it, as described above in connection with FIG. 2 it does not affect the accuracy of the output signal $e_o$ as a function of the input signal $e_i$.

The major advantage of the circuit of FIG. 8 over the circuits of FIGS. 5 and 6, for example, is that the former requires only one diode and only one pair of matched resistors. The magnitudes of resistors 56 and 82 do not affect the circuit operation. If resistors $R_1$ and $R_2$ are equal in magnitude, the circuit functions as an absolute magnitude peak detector.

The circuit of FIG. 9 is similar to that of FIG. 8 except that resistor 56 of FIG. 8 is now identified as resistor $R_6$, and the negative input terminal of operational amplifier 76 is coupled through resistor $R_7$ to ground. The negative gain of operational amplifier 70 (which controls output voltage $e_o$ only for negative inputs) is $R_2/R_1$. With respect to operational amplifier 76, the fraction of the output voltage fed back to the negative input terminal is $R_7/(R_7+R_6)$. The potential at the positive input terminal is $e_i$, and since the feedback causes a null across the two input terminals, $e_i=e_oR_7/(R_7+R_6)$. The gain of the lower operational amplifier in the case of positive inputs is thus $(R_7+R_6)/R_7$. For the circuit to function as an absolute magnitude peak detector the gains of the upper and lower operational amplifiers should be identical, that is, $R_2/R_1=(R_7+R_1)=(R_7+R_6)/R_7$. It is thus apparent that with the proper choice of resistor values, the circuit of FIG. 9 can provide amplification—the output signal $e_o$ can be made to equal the absolute magnitude of the input signal multiplied by a predetermined constant. In such a case, four resistors must have predetermined impedance ratios although the circuit still only requires a single diode.

Although the invention has been described with reference to particular embodiments it is to be understood that these embodiments are merely illustrative of the application of the principles of the invention. For example, using amplifiers whose negative drive capabilities exceed their positive drive capabilities, it is possible to reverse the polarity of the output diode and to obtain a negative peak output. Thus numerous modifications may be made in the illustrative embodiments of the invention and other arrangements may be devised without departing from the spirit and scope of the invention.

I claim:

1. An absolute magnitude peak detector comprising a pair of operational amplifiers, each of said operational amplifiers having a pair of opposite polarity input terminals and first and second opposite polarity drive capabilities, the first drive capability of each operational amplifier exceeding its second drive capability, coupling means for coupling an input signal to a first input terminal of each of said operational amplifiers, said first terminals being of opposite polarities, a first feedback path connecting the output of one of said operational amplifiers to the respective first input terminal, a second feedback path connecting the output of the other of said operational amplifiers to the respective second input terminal, each of said first and second feedback paths including a common diode polarized in the direction of current flow from each of said operational amplifiers when it is driven in the direction of its greatest capability, a capacitor, means connecting said diode to said capacitor, said coupling means including resistance means connected to each of said first input terminals, said second input terminal of said one operational amplifier being extended to a source of fixed potential and each of said feedback paths including resistance means, additional resistance means connected between said second input terminal of said other operational amplifier and a source of fixed potential, the gains of said operational amplifiers from said input signal coupling means to the junction of said diode and said capacitor being equal, and said resistance means of said first feedback path having a magnitude equal to that of said input signal coupling resistance means.